United States Patent [19]
Sato

[11] Patent Number: 5,473,582
[45] Date of Patent: Dec. 5, 1995

[54] MAGNETO OPTICAL RECORDING METHOD HAVING CONSTANT RECORDING SENSITIVITY AND MAGNETO-OPTICAL RECORDING MEDIUM USED THEREFOR

[75] Inventor: Masatoshi Sato, Tokyo, Japan

[73] Assignee: Nikon Corporation, Tokyo, Japan

[21] Appl. No.: 300,036

[22] Filed: Sep. 2, 1994

[30] Foreign Application Priority Data

Sep. 2, 1993 [JP] Japan ................................ 5-218899

[51] Int. Cl.$^6$ .................................................. G11B 11/00
[52] U.S. Cl. .............. 369/13; 428/694 RE; 428/694 EC; 360/114
[58] Field of Search ............................. 369/13, 14, 283, 369/275.2, 275.4, 288, 286; 360/114, 59; 365/122; 428/694 SC, 694 RE, 694 MM, 694 EC

[56] References Cited

U.S. PATENT DOCUMENTS

| | | | |
|---|---|---|---|
| 4,995,024 | 2/1991 | Arimune et al. | 369/13 |
| 5,239,524 | 8/1993 | Sato et al. | 369/13 |

FOREIGN PATENT DOCUMENTS

| | | |
|---|---|---|
| 0373898 | 6/1990 | European Pat. Off. . |
| 3912378A1 | 10/1989 | Germany . |
| 58-73746 | 5/1983 | Japan . |
| 59-61011 | 4/1984 | Japan . |
| 60-107751 | 6/1985 | Japan . |
| 60-189208 | 9/1985 | Japan . |
| 60-237655 | 11/1985 | Japan . |
| 61-296551 | 12/1986 | Japan . |
| 2-273351 | 11/1990 | Japan . |
| 3-16049 | 1/1991 | Japan . |

OTHER PUBLICATIONS

D. Raasch, "Recording Characteristics of Dy–FeCo–Based Magneto–Optical Disks in Comparison to Other MO Materials", IEEE Transactions on Magnetics, vol. 29, Jan., 1993, N.Y. pp. 34–40.

T. K. Hatwar et al., "Correlation of Composition And Angular Uniformity With Performance in Magneto–Optic Disk Prepared From Alloy Targets", Journal of Applied Physics, vol. 67, May 1, 1990, N.Y., pp. 5304–5306.

K. Nagato et al., "Compositional Dependence of Recording Noise In Amorphous Rare–Earth–Transition–Metal Magneto–Optical Disks", Journal of Applied Physics, vol. 63, Apr. 15, 1988, N.Y., pp. 3856–3858.

Primary Examiner—Ali Neyzari
Attorney, Agent, or Firm—Oliff & Berridge

[57] ABSTRACT

A magneto-optical recording medium includes a magnetizable amorphous alloy film having a perpendicular magnetic anisotropy to the film surface. The film is formed from rare earth metals and transition metal, such that the film has a Curie point that increases as the proportion of the transition metals increases. A magneto-optical recording method includes establishing a recording magnetic field and magneto-optically recording onto the film such that even if there are compositional changes in the film, little influence on recording sensitivity results.

15 Claims, 2 Drawing Sheets

MAGNETO OPTICAL RECORDING METHOD HAVING CONSTANT RECORDING SENSITIVITY AND MAGNETO-OPTICAL RECORDING MEDIUM USED THEREFOR

BACKGROUND OF THE INVENTION

1. Field of the Invention

The present invention relates to a magneto-optical recording medium and magneto-optical recording method wherein the recording, erasure, and reproduction of data is magnetically accomplished in a heated state by means of irradiation with a laser beam.

2. Description of Related Art

Recently, optical recording and reproduction methods have been developed that satisfy demands for high density, high capacity, high access speed, high recording speed, high reproduction speed, etc. In addition, recording devices in the form of reproduction devices and recording mediums have been developed using the recently-developed recording and reproduction methods for these stated purposes.

Among the many optical reproduction methods, the magneto-optical method is capable of over-write operation. That is, the magneto-optical method is capable of erasing data that has already been recorded on the recording medium. Following erasure, the magneto-optical method has the advantage of being capable of again recording new data on the recording medium, a capability that has a great deal of appeal.

Generally, the magneto-optical method is accomplished through the irradiation of a laser beam on a medium that possesses a perpendicularly magnetized film recording layer. The direction of magnetization of the recording layer is predirected either upwardly or downwardly, as the case may be, in advance of recording. When recording, a portion of the recording layer is heated to a temperature close to that of the Curie point, at which magnetization becomes zero, by means of a laser beam having a very small diameter of about 1 μm. This small diameter laser beam forms a mark that has an opposite direction of magnetization by reducing the coercivity (Hc) of the locally heated portion of the recording medium to a value below the magnetic recording bias field (Hb). The data is manifest on the recording medium by means of the existence or nonexistence of, and the length of, the resulting mark. Reproduction of the recorded data is accomplished by irradiating polarized light beams onto the recording layer of the recording medium. The polarized light is rotated by $\theta_K$ degrees in the recording layer according to the direction of magnetization, a principle known as the magnetic Kerr effect. The reflected light is then detected, analyzed and converted to an electric signal, thus reading the data.

The recording medium that utilizes this magneto-optical recording and reproduction method may utilize, as the recording layer, known amorphous alloys of rare earth and transition metals that possess perpendicular magnetic anisotropy. In particular, TbFeCo is generally used because it is a substance in which the recording state can be stably maintained, and it has large coercivity.

Various methods exist that can be used as the method for forming a recording film, including the evaporation method, the ion plating method, the sputtering method, and the ion beam sputtering method. However, general use is made of the sputtering method, in which utilization is made of argon gas due to its known ease of handling. Since there is efficiency in the ionization of the argon gas in this method, the magnetron sputtering method is generally used, in which a magnet is housed at the bottom of the sputtering target. In addition, the magnetron sputtering method uses multiple targets, comprised of rare earth metal targets and transition metal targets. These respective targets allow for the utilization of such known methods as the simultaneous plural sputtering method, which independently controls the sputtering, and the sputtering method in which alloy targets are used that comprise rare earth alloy metals and transition metals.

However, problems are noted if the magneto-optical recording medium is constructed by means of the magnetron sputtering method using the above-mentioned simultaneous plural sputtering procedure. Namely, because rare earth metal targets and transition metal targets are used in the simultaneous plural sputtering, compositional changes in terms of thickness are small. However, use of the magnetron sputtering method, combined with the dissipation of the transition metal target, causes the sputtering efficiency to be changed by means of changes in the stray field from the magnet that is located at the bottom of the target. As a result, there is a complete change in the proportional ratio between the rare earth metals and the transition metals over the passage of time. In other words, there is a complete change in the composition.

On the other hand, the target which is an alloy of rare earth metal and transition metal changes in its composition in terms of thickness during the manufacturing method. As a result, in accompaniment with the dissipation of the target, there is the problem of a complete change in the composition of the formed film.

The existing problem, therefore, is that there is a change in recording sensitivity of the magneto-optical recording medium. This change is striking, particularly when a TbFeCo recording film is used.

SUMMARY OF THE INVENTION

In order to overcome these problems, the present invention provides a magneto-optical recording medium and a magneto-optical recording method wherein the recording, erasure, and reproduction of data is magnetically accomplished in a heated state by means of irradiation with a laser beam.

One embodiment of the present invention relates to a magneto-optical recording medium comprising a magnetizable amorphous alloy film having a perpendicular magnetic anisotropy to the film surface. The alloy film comprises rare earth metals and transition metals and is characterized by the property that the Curie point of the film increases as the proportion of the transition metals increases.

A further aspect of the present invention relates to a magneto-optical recording medium wherein the compensation temperature of the magnetizable amorphous alloy film is higher than room temperature and lower than the Curie point.

In embodiments of the present invention, the composition of the film satisfies the formula:

$$Dy_x(Fe_{100-y}Co_y)_{100-x}$$

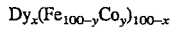

wherein $26 \leq x \leq 29$ and $15 \leq y \leq 25$. Here, the proportion is provided in terms of atomic percent.

In other embodiments of the present invention, the composition of the film satisfies the formula:

$$(Tb_{100-z}Dy_z)_x(Fe_{100-y}Co_y)_{100-x}$$

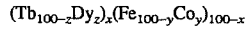

wherein $26 \leq x \leq 29$, $15 \leq y \leq 25$, and $50 \leq z \leq 95$, represented in terms of atomic percent.

In another aspect of the present invention, a magneto-optical recording medium is provided comprising a magnetizable amorphous alloy film having a perpendicular magnetic anisotropy to the film surface. The film comprises rare earth metals and transition metals and is characterized by the property that the Curie point of the film increases as the proportion of the transition metals increases. Recording on the film is accomplished by irradiating a laser beam on the film, with the laser beam being modulated according to the information to be recorded, while establishing a recording magnetic field around the film.

The magneto-optical recording method in embodiments of the present invention uses a magneto-optical recording medium produced such that a variation in relative amounts of the rare earth metals and the transition metals from a predetermined proportion in the alloy film results in little or no change in temperature at which the film has a predetermined coercivity.

Furthermore, the present invention relates to a magneto-optical recording method wherein the magnitude of the recording magnetic field is from 300 Oe to 600 Oe.

BRIEF DESCRIPTION OF THE DRAWINGS

The invention will be described in more detail with reference to the following drawings in which like reference numerals refer to like elements, and wherein.

DETAILED DESCRIPTION OF PREFERRED EMBODIMENTS

The present invention will now be described in more detail with reference to specific embodiments thereof. Additional information and description of the related subject matter may be found in U.S. Pat. No. 5,239,524, the entire disclosure of which is incorporated herein by reference.

Figure 2:
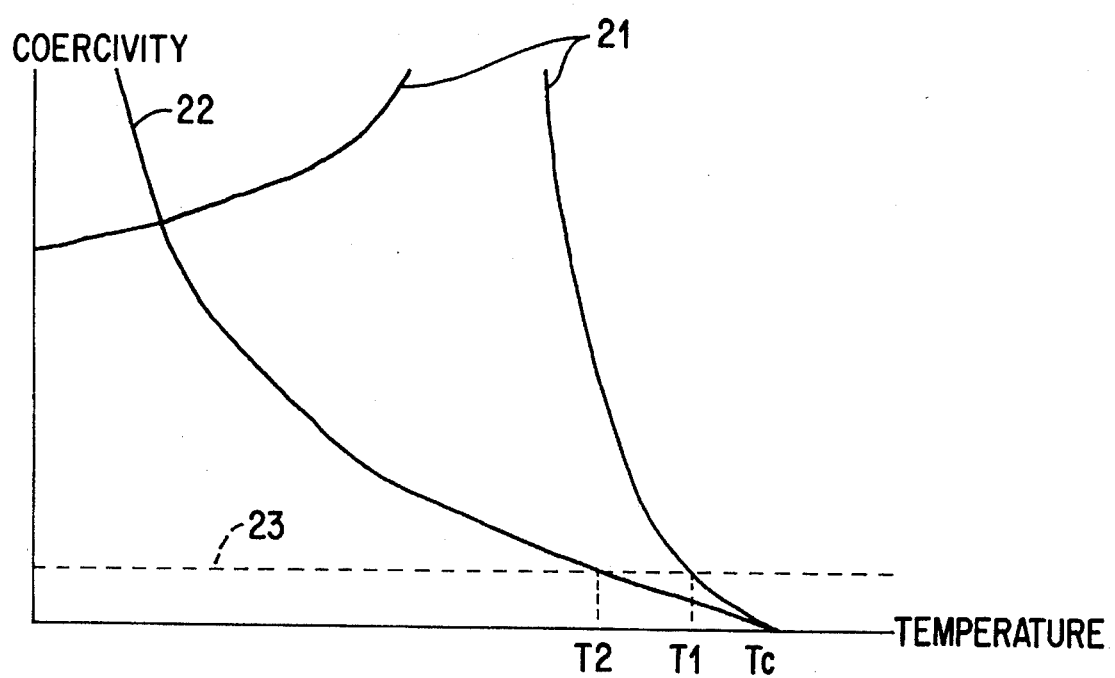
FIG. 2 is a summary drawing that shows the relationship between the temperature characteristics and the coercivity of a recording medium and the recording magnetic field according to conventional technology.

FIG. 2 shows the temperature characteristics of the coercivity of TbFeCo, commonly used in the prior art. In FIG. 2, lines 21 show a composition having a higher amount of rare earth metals than the desired composition, and line 22 shows a composition having a higher amount of transition metals than the desired composition. Hereafter the state where the composition has a higher amount of rare earth metals than the desired composition will be referred to as being RE rich; when the composition has a higher amount of transition metals than the desired composition, the state is referred to as TM rich.

When recording on a TbFeCo medium as in FIG. 2, since heating is accomplished during the time in which the recording magnetic field 23 is being applied, the recording sensitivity is such that a point of intersection is pre-established between the temperature characteristics of the coercivity and the recording magnetic field. In the case of TbFeCo, since the proportional percentage of Tb changes, there is no change in the Curie point (Tc). As such, since the temperature characteristics of the coercivity changes in the manner shown in FIG. 2, the intersecting temperature of the temperature characteristics of the coercivity and the recording magnetic field changes from $T_1$ to $T_2$. This moment becomes a change in recording sensitivity, and represents a problem in that it is a source of change in the length of a mark when the mark is being recorded on the recording medium.

Figure 1:
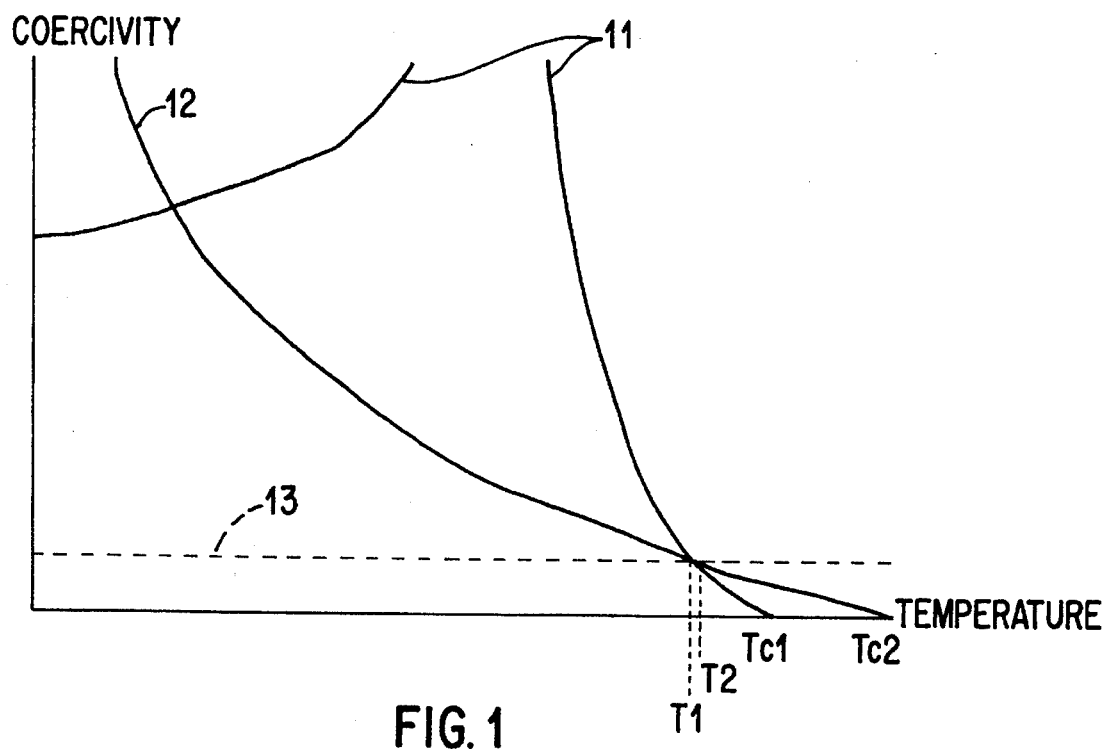
FIG. 1 is a summary drawing that shows the relationship between the temperature characteristics and the coercivity of the recording medium and the recording magnetic field.

On the other hand, FIG. 1 shows the temperature characteristics of the coercivity of the recording medium of the present invention. In FIG. 1, lines 11 represent a medium in which the amount of the rare earth metals are RE rich, being greater than the desired composition. Line 12 shows the temperature characteristics where the proportion of transition metals is great, being TM rich, and greater than the desired composition.

When recording on a medium as in FIG. 1, since heating is accomplished during the period in which the recording magnetic field 13 is being applied, as was the case with TbFeCo, the recording sensitivity has a pre-established point of intersection between the recording magnetic field and the temperature characteristics of the coercivity, as described above. The recording medium of the present invention is such that when the transition metals are greater, the Curie point is higher. Therefore, the Curie point ($Tc_2$) of the TM rich state is higher than the Curie point ($Tc_1$) of the RE rich state. Because of this, compensation is mutually accomplished for changes in the Curie point and the temperature characteristics of the coercivity. Furthermore, the recording magnetic field and the intersecting temperature do not change greatly, even when there is a TM rich state ($T_2$), or when there is an RE rich state ($T_1$). Even when there are changes in the composition, the amount of variation in the degree of recording sensitivity can be suppressed. As a result, changes in the length of the recorded mark are minimal.

A detailed description of an embodiment of the present invention will now be provided.

FIRST EMBODIMENT

A magnetron sputtering device that can accommodate sputtering for four targets includes a disk type guide groove equipped polycarbonate base plate placed within a vacuum chamber. The base plate has a thickness of 1.2 millimeters and a diameter of 130 millimeters. The air is then evacuated from the vacuum chamber until a pressure of approximately $1 \times 10^{-6}$ Pa is reached. Sputtering is commenced using Ar as the sputtering gas, into which $N_2$ has been introduced in the amount of 5%, the sputtering being accomplished while the gas is introduced into the chamber to create a pressure of 0.25 Pa. Silicon nitride is thus formed into a film having a thickness of 110 nm. Sputtering is accomplished on the Dy target and the FeCo alloy target by continuing to introduce only Ar as the sputtering gas, so as to establish a 0.3 Pa pressure. Table 1 shows data for DyFeCo recording films formed under various conditions to a film thickness of 200 nm on the silicon nitride film.

Sputtering is continued by introducing a sputtering gas of Ar and 5% $N_2$ to a pressure of 0.25 Pa. Silicon nitride is thus formed into a film having a thickness of 50 nm on the DyFeCo film. Sputtering is accomplished by continuing to introduce only Ar as the sputtering gas to raise the pressure to 0.3 Pa, thus forming an Al film having a thickness of 60 nm. A sheet of magneto-optical recording medium is thus produced.

Through a repetition of the above procedures, multiple numbers of magneto-optical disks can be produced. Among these, a magneto-optical disk is established as a sub-ring every 100 sheets. With a linear velocity of 8 m/sec relative to the disk and a recording magnetic field of 350 Oe, measurements can be made of the optical recording laser beam signal of 1 Mhz. The results are shown in Table 1. According to Table 1, even if changes occur in the composition of the recording film caused by time changes in the Dy target and the FeCo alloy target, the changes in the recording sensitivity (the optimal recording laser beam strength) are largely non-existent.

Figure 3:
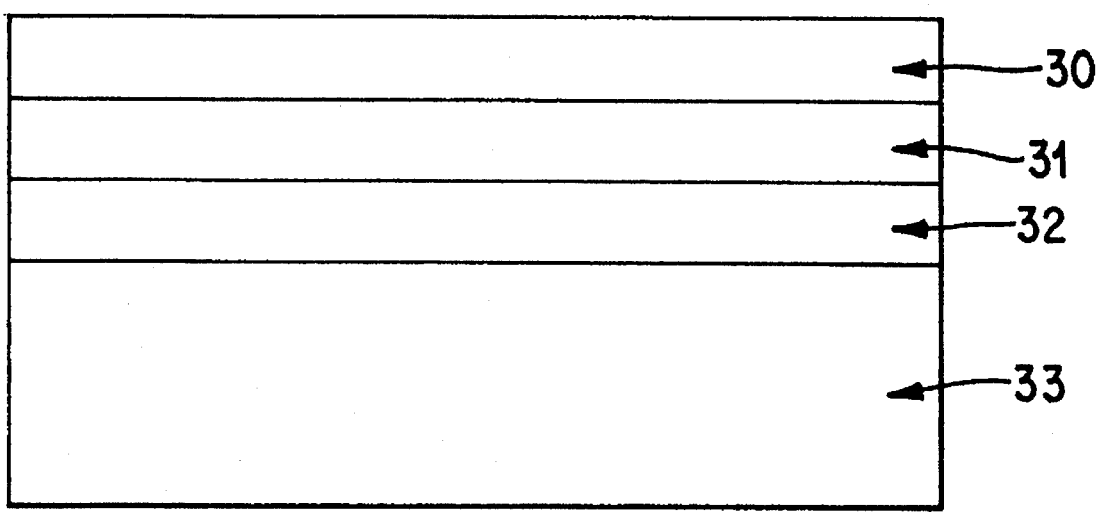
FIG. 3 is a diagram of a magneto-optical recording medium of embodiments of the present invention.

FIG. 3 provides a diagram of the magneto-optical recording medium described above. In FIG. 3, layer 33 is the base plate, on which the succeeding films are formed. Layer 32 is the first silicon nitride layer. The recording layer, comprised here of DyFeCo, is layer 31, formed upon the first silicon nitrile layer. Layer 30 is the second silicon nitrile layer formed on the opposite side of the recording layer 31.

COMPARATIVE EXAMPLE 1

Establishing the recording film with a film of TbFeCo can be accomplished by using a Tb target and a FeCo alloy target for the purpose of sputtering. Magneto-optical disks can then be continuously manufactured in accordance with the process described as to the DyFeCo films of embodiment 1 above. Measurements are taken of the optical recording laser beam strength under the same conditions as described in embodiment 1. The results are as shown in Table 1. From Table 1, it is understood that changes in the recording sensitivity are significantly greater for TbFeCo films than for DyFeCo films of embodiment 1.

TABLE 1

| Production | Composition | Recording Sensitivity (mW) | | | | | |
|---|---|---|---|---|---|---|---|
| | Number | 1 | 101 | 201 | 301 | 401 | 501 |
| Embodiment 1 | $Dy_{30}(Fe_{72}Co_{28})_{70}$ | 6.2 | 6.4 | 6.6 | 6.9 | 7.1 | 7.5 |
| Embodiment 1 | $Dy_{28}(Fe_{77}Co_{23})_{72}$ | 8.1 | 8.1 | 8.1 | 8.2 | 8.2 | 8.3 |
| Embodiment 1 | $Dy_{27}(Fe_{37}Co_{25})_{73}$ | 10.0 | 10.0 | 10.1 | 10.2 | 10.2 | 10.3 |
| Embodiment 1 | $Dy_{26}(Fe_{85}Co_{15})_{74}$ | 8.0 | 8.0 | 8.1 | 8.1 | 8.1 | 8.2 |
| Embodiment 1 | $Dy_{25}(Fe_{81}Co_{19})_{75}$ | 7.6 | 7.4 | 7.2 | 7.0 | 6.9 | 6.8 |
| Comparative 1 | $Tb_{28}(Fe_{94}Co_{6})_{72}$ | 8.2 | 8.0 | 7.7 | 7.5 | 7.1 | 6.6 |
| Comparative 1 | $Tb_{27}(Fe_{89}Co_{11})_{73}$ | 10.0 | 9.7 | 9.3 | 8.9 | 8.1 | 7.8 |
| Comparative 1 | $Tb_{26}(Fe_{94}Co_{6})_{74}$ | 8.0 | 7.6 | 7.0 | 6.7 | 6.1 | 5.6 |

SECOND EMBODIMENT

As was the case with embodiment 1, a glass base plate that is fitted with a disk shaped guide groove and having a thickness of 1.2 millimeters and a diameter of 305 millimeters is set in a magnetron sputtering device within a vacuum chamber. After the air is evacuated from the vacuum chamber until a pressure of about $1\times10^{-5}$ Pa is reached, an Ar sputtering gas with 5% $N_2$ is introduced to the chamber while sputtering is being accomplished, to bring the pressure to 0.1 Pa. A silicon nitride film having a film thickness of 70 nm is thus formed. Continuing, as the sputtering gas, only Ar is introduced to bring the pressure to 0.2 Pa. Sputtering is accomplished by means of the TbDyFeCo alloy target. As shown in Table 2, a recording film of TbDyFeCo forms a film under various conditions having a film thickness of 60 nm on the silicon nitride film. While sputtering is continued, 5% $N_2$ is added to the Ar gas and introduced to the chamber to establish a pressure of 0.1 Pa. A silicon nitride film having a film thickness of 70 nm on the TbDyFeCo film is thus created. Using this process, a sheet of a magneto-optical recording medium is created by means of the above process.

Multiple magneto-optical disks can be continuously produced by repeating the above process. Among these, a magneto-optical disk is established as a sub-ring after every 200 sheets. With a linear velocity of 10 m/sec relative to these disks, and a recording magnetic field of 300 Oe, measurements can be made of an optimal recording laser beam strength having a signal of 1 Mhz. The results are as shown in Table 2. According to Table 2, even though changes may occur in the composition of the recording film due to changes in the TbDyFeCo target over time, changes in recording sensitivity (the optimal recording laser beam strength) are almost non-existent.

COMPARATIVE EXAMPLE 2

Establishing the recording film with a film of TbFeCo can be accomplished by using a Tb target and a FeCo alloy target for the purpose of sputtering. Magneto-optical disks can then be continuously manufactured in accordance with the process described as to the TbDyFeCo films of embodiment 2 above. Next, under the same conditions as existed in embodiment 2, measurements are taken of the optimal recording laser beam strength. The results are shown in Table 2. According to Table 2, changes in the recording sensitivity are significantly higher for TbFeCo films than for the TbDyFeCo films of embodiment 2.

TABLE 2

| | Composition | Recording Sensitivity (mW) | | | | |
|---|---|---|---|---|---|---|
| | Production Number | 1 | 201 | 401 | 601 | 801 |
| Embodiment 2 | $(Tb_{10}Dy_{90})_{26}(Fe_{85}Co_{15})_{74}$ | 6.1 | 6.1 | 6.2 | 6.2 | 6.3 |
| Embodiment 2 | $(Tb_{20}Dy_{80})_{27}(Fe_{82}Co_{18})_{73}$ | 6.8 | 6.8 | 6.8 | 6.9 | 6.9 |
| Embodiment 2 | $(Tb_{40}Dy_{60})_{28}(Fe_{78}Co_{22})_{72}$ | 7.7 | 7.7 | 7.6 | 7.6 | 7.5 |
| Comparative 2 | $Tb_{26}(Fe_{94}Co_{6})_{74}$ | 6.2 | 5.6 | 5.0 | 4.6 | 4.0 |
| Comparative 2 | $Tb_{27}(Fe_{91}Co_{9})_{73}$ | 6.9 | 6.2 | 5.8 | 5.1 | 4.8 |
| Comparative 2 | $Tb_{28}(Fe_{87}Co_{13})_{72}$ | 7.6 | 7.2 | 6.7 | 6.2 | 5.8 |

As indicated above, according to the present invention, even if changes occur in the composition of the recording film as a result of changes in the composition of the target over time, a magneto-optical recording medium and recording method is provided in which the changes in the recording sensitivity are small.

While this invention has been described in conjunction with specific embodiments thereof, it is evident that many alternatives, modifications and variations will be apparent to those skilled in the art. Accordingly, the preferred embodiments of the invention as set forth herein are intended to be illustrative only, and are not limiting. Various changes may be made without departing from the spirit and scope of the invention as defined in the following claims.

What is claimed is:

1. A magneto-optical recording medium comprising a magnetizable amorphous alloy film having a perpendicular magnetic anisotropy to the film surface, said film comprising rare earth metals and transition metals in proportions such that a Curie point of said film increases as the proportion of the transition metals increases, wherein a variation in relative amounts of the rare earth metals and the transition metals from a predetermined proportion in said film results in little or no influence on recording sensitivity and wherein the composition of said film satisfies the formula:

$$Dy_x(Fe_{100-y}Co_y)_{100-x}$$

wherein $26 \leq x \leq 29$ and $15 \leq y \leq 25$, as expressed in terms of atomic percent.

2. A magneto-optical recording medium as in claim 1, wherein said film has a compensation temperature higher than room temperature and lower than the Curie point.

3. A magneto-optical recording medium as in claim 1, wherein a variation in relative amounts of the rare earth metals and the transition metals from a predetermined proportion in said film results in little or no change in a temperature at which the film has a predetermined coercivity.

4. A magneto-optical recording medium as in claim 1, wherein said film is formed by a sputtering method or by an evaporation method.

5. A magneto-optical recording method, comprising:
   (a) providing a magneto-optical recording medium comprising a magnetizable amorphous alloy film having a perpendicular magnetic anisotropy to the film surface, said film comprising rare earth metals and transition metals in proportions such that a Curie point of said film increases as the proportion of the transition metals increases, and wherein the composition of said film satisfies the formula:

$$Dy_x(Fe_{100-y}Co_y)_{100-x}$$

wherein $26 \leq x \leq 29$ and $15 \leq y \leq 25$, as expressed in terms of atomic percent
   (b) irradiating a laser beam on said film, said laser beam modulated according to the information to be recorded on said film, and
   (c) establishing a recording magnetic field around said film;
   wherein the variation in relative amounts of the rare earth metals and the transition metals from a predetermined proportion in said film results in little or no influence on recording sensitivity.

6. A magneto-optical recording method according to claim 5, wherein the recording magnetic field is established at a magnitude of from 300 Oe to 600 Oe.

7. A magneto-optical recording method according to claim 5, wherein said film has a compensation temperature higher than room temperature and lower than the Curie point.

8. A magneto-optical recording method according to claim 5, wherein said film is formed by a sputtering method or by an evaporation method.

9. A magneto-optical recording medium comprising a magnetizable amorphous alloy film having a perpendicular magnetic anisotropy to the film surface, said film comprising rare earth metals and transition metals in proportions such that a Curie point of said film increases as the proportion of the transition metals increases, and the composition of said film satisfies the formula:

$$(Tb_{100-z}Dy_z)_x(Fe_{100-y}Co_y)_{100-x}$$

wherein $26 \leq x \leq 29$, $15 \leq y \leq 25$ and $50 \leq z \leq 95$, as expressed in terms of atomic percent and wherein a variation in relative amounts of the rare earth metals and the transition metals from a predetermined proportion in said film results in little or no change in a temperature at which the film has a predetermined coercivity.

10. A magneto-optical recording medium as in claim 9, wherein said film has a compensation temperature higher than room temperature and lower than the Curie point.

11. A magneto-optical recording medium as in claim 9, wherein said film is formed by a sputtering method or by an evaporation method.

12. A magneto-optical recording method, comprising:
   (a) providing a magneto-optical recording medium comprising a magnetizable amorphous alloy film having a perpendicular magnetic anisotropy to the film surface, said film comprising rare earth metals and transition metals in proportions such that a Curie point of said film increases as the proportion of the transition metals increases, wherein the composition of said film satisfies the formula:

$$(Tb_{100-z}Dy_z)_x(Fe_{100-y}Co_y)_{100-x}$$

wherein $26 \leq x \leq 29$, $15 \leq y \leq 25$ and $50 \leq z \leq 95$, as expressed in terms of atomic percent;
   (b) irradiating a laser beam on said film, said laser beam modulated according to the information to be recorded on said film; and
   (c) establishing a recording magnetic field around said film;
   wherein the variation in relative amounts of the rare earth metals and the transition metals from a predetermined proportion in said film results in little or no influence on recording sensitivity.

13. A magneto-optical recording method according to claim 12, wherein the recording magnetic field is established at a magnitude of from 300 Oe to 600 Oe.

14. A magneto-optical recording method according to claim 12, wherein said film has a compensation temperature higher than room temperature and lower than the Curie point.

15. A magneto-optical recording method according to claim 12, wherein said film is formed by a sputtering method or by an evaporation method.

* * * * *